(12) United States Patent
Kaminsky et al.

(10) Patent No.: US 9,097,294 B2
(45) Date of Patent: Aug. 4, 2015

(54) CONTROL OF CLUTCH FILL COMMAND BASED ON HYDRAULIC STATE OF ONCOMING CLUTCH

(75) Inventors: Lawrence A. Kaminsky, White Lake, MI (US); Jy-Jen F. Sah, West Bloomfield, MI (US); Besim Demirovic, Troy, MI (US); Pinaki Gupta, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 464 days.

(21) Appl. No.: 13/570,702

(22) Filed: Aug. 9, 2012

(65) Prior Publication Data

US 2014/0045654 A1    Feb. 13, 2014

(51) Int. Cl.
G06F 7/02        (2006.01)
F16D 48/02       (2006.01)
F16D 48/06       (2006.01)
F16H 61/06       (2006.01)

(52) U.S. Cl.
CPC ............... *F16D 48/02* (2013.01); *F16D 48/06* (2013.01); *F16D 48/066* (2013.01); *F16H 61/061* (2013.01); *F16D 2500/1026* (2013.01); *F16D 2500/10412* (2013.01); *F16D 2500/30406* (2013.01); *F16D 2500/5014* (2013.01); *F16D 2500/5035* (2013.01); *F16H 2061/062* (2013.01); *Y10T 477/753* (2015.01)

(58) Field of Classification Search
CPC ................. B60W 2710/021; F16H 2061/062
USPC ........ 192/85.6; 701/67, 68; 477/70, 166, 180, 477/174
See application file for complete search history.

(56) References Cited

U.S. PATENT DOCUMENTS

| | | | |
|---|---|---|---|
| 6,915,890 B1 | 7/2005 | Whitton et al. | |
| 2007/0054776 A1* | 3/2007 | Shizume | 477/174 |
| 2009/0111643 A1 | 4/2009 | Sah et al. | |
| 2010/0087999 A1* | 4/2010 | Neelakantan et al. | 701/67 |

(Continued)

FOREIGN PATENT DOCUMENTS

EP    1990561 A1    11/2008

OTHER PUBLICATIONS

Kaminsky et al., Clutch Fill Command Based on Clutch Slip Speed Profile Synchronization Prediction, Pending U.S. Appl. No. 13/024,660, Projected Publication Date Aug. 16, 2012.

*Primary Examiner* — Justin Holmes
*Assistant Examiner* — Stacey Fluhart
(74) *Attorney, Agent, or Firm* — Quinn Law Group, PLLC

(57) ABSTRACT

A system and method of controlling a clutch fill command based on the hydraulic state of an oncoming clutch is provided. A vehicle includes a hydraulically-actuated oncoming clutch that is configured to engage during a shift event from one operating mode of the vehicle to another. A controller is configured to generate a clutch fill command at an initial time such that completion of the clutch fill command is synchronized with an identified speed profile of the oncoming clutch. The oncoming clutch defines a real-time hydraulic state when the clutch fill command is generated. The controller is configured to generate a real-time acceptable speed margin for the oncoming clutch based at least partially on the real-time hydraulic state of the oncoming clutch. The controller is configured to cancel the clutch fill command if a real-time speed of the oncoming clutch is outside the generated real-time acceptable speed margin.

11 Claims, 2 Drawing Sheets

(56) References Cited

U.S. PATENT DOCUMENTS

| | | |
|---|---|---|
| 2010/0298089 A1 | 11/2010 | Sah |
| 2010/0305791 A1 | 12/2010 | Sah et al. |
| 2012/0067690 A1* | 3/2012 | Postic et al. ............... 192/85.63 |
| 2012/0209461 A1 | 8/2012 | Kaminsky et al. |

* cited by examiner

US 9,097,294 B2

CONTROL OF CLUTCH FILL COMMAND BASED ON HYDRAULIC STATE OF ONCOMING CLUTCH

TECHNICAL FIELD

The disclosure relates generally to a vehicle having a hydraulically-actuated clutch, and more specifically, to control of a clutch fill command based on the hydraulic state of an oncoming clutch.

BACKGROUND

Vehicles generally include one or more clutches for performing various functions. A clutch generally uses friction to rotatably couple two different elements, for example, rotatably coupling an input shaft to an output shaft. Clutches that are designed to operate synchronously (or without slip) require substantially zero relative velocity when reactive torque is transmitted through the clutch. Clutch slip refers to the difference between the rotational speeds of the coupled elements, for example, the input and output shafts. Any pressure applied on a slipping clutch may result in heat being generated on the friction material in the clutch. This may result in wear and eventual degradation of the friction material.

SUMMARY

A system and method of controlling a clutch fill command based on the hydraulic state of an oncoming clutch is provided. A vehicle defines a plurality of operating modes. The vehicle includes a hydraulically-actuated oncoming clutch that is configured to engage during a shift event from one operating mode of the vehicle to another. A controller is configured to generate a clutch fill command at an initial time such that completion of the clutch fill command is synchronized with an identified speed profile of the oncoming clutch. The oncoming clutch defines a real-time hydraulic state when the clutch fill command is generated. The controller is configured to cancel the clutch fill command if a real-time speed (actual clutch slip speed or clutch speed profile) of the oncoming clutch is outside a real-time acceptable speed margin. This serves to prevent pressure from being applied to an oncoming clutch that is slipping, thereby protecting the slipping clutch.

The controller is configured to proceed with the clutch fill command if the real-time speed of the oncoming clutch is within the generated real-time acceptable speed margin. The real-time acceptable speed margin for the oncoming clutch is generated based at least partially on the real-time hydraulic state of the oncoming clutch. The real-time speed of the oncoming clutch may be determined with a speed sensor that is operatively connected to the oncoming clutch.

The clutch fill command is configured to cause a predefined fill volume to be filled with a fluid. The real-time hydraulic state of the oncoming clutch may be characterized by a remaining fill time, the remaining fill time being defined as an amount of time remaining to fill an unfilled portion of the predefined fill volume.

The vehicle may include a first monitor operatively connected to the oncoming clutch and configured to determine a real-time unfilled portion of the predefined fill volume. A fluid pump may be configured to selectively provide the fluid to the predefined fill volume when the clutch fill command is requested by the controller. A second monitor may be operatively connected to the oncoming clutch and configured to determine a real-time flow rate of the fluid entering the predefined fill volume. The controller may determine the remaining fill time at least partially based on the real-time unfilled portion of the predefined fill volume and the real-time flow rate, that is, the real-time unfilled portion of the predefined fill volume divided by the real-time flow rate and adjusted with calibration offset values.

A method of controlling a clutch fill command of an oncoming hydraulically-actuated clutch during a shift event is provided. The method includes identifying a speed profile associated with the oncoming clutch and the shift event, the speed profile defining an amount of time to synchronize the oncoming clutch during the shift event. An initial time is determined for generating a clutch fill command such that completion of the clutch fill command is synchronized with the identified speed profile of the oncoming clutch. A clutch fill command is generated at the initial time. The method includes detecting a real-time speed of the oncoming clutch based at least partially on a speed sensor operatively connected to the oncoming clutch. A real-time hydraulic state of the oncoming clutch is determined based on one or more monitors operatively connected to the clutch.

The method includes canceling the clutch fill command if a real-time speed of the clutch is outside an acceptable speed margin for the clutch. The method includes proceeding with the clutch fill command if the real-time speed of the clutch is within the acceptable speed margin for the clutch. The acceptable speed margin is generated for the oncoming clutch based at least partially on the real-time hydraulic state of the oncoming clutch. The real-time speed of the clutch is determined from a speed sensor operatively connected to the clutch.

The above features and advantages and other features and advantages of the present invention are readily apparent from the following detailed description of the best modes for carrying out the invention when taken in connection with the accompanying drawings.

DETAILED DESCRIPTION

Figure 1:
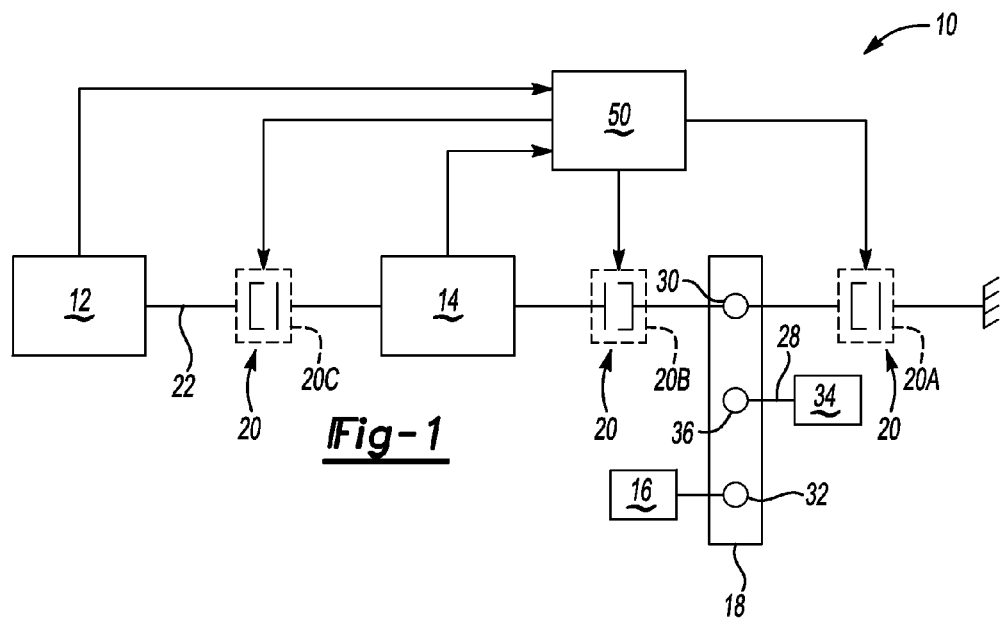
FIG. 1 is a schematic illustration of a vehicle having a controller configured to control engagement for an oncoming clutch in the vehicle.

A vehicle is provided with a controller configured to control the engagement of an oncoming clutch based at least partially on a real-time hydraulic state of the clutch. The vehicle may take many different forms and include multiple and/or alternate components and facilities. While an example vehicle is shown in the Figures, the components illustrated in the Figures are not intended to be limiting. Indeed, additional or alternative components and/or implementations may be used. FIG. 1 illustrates an example vehicle 10 that includes an engine 12, a first motor 14, a second motor 16, a gearbox 18, one or more hydraulically-actuated clutches 20 and a controller 50. The vehicle 10 may be any passenger or commercial automobile such as a hybrid electric vehicle including a plug-in hybrid electric vehicle, an extended range electric vehicle, or other vehicles.

The engine 12 may include any device configured to generate an engine torque by, for example, converting a fuel into rotational motion. Accordingly, the engine 12 may be an internal combustion engine configured to convert energy from a fossil fuel into rotational motion using a thermodynamic cycle. The engine 12 may be configured to output the engine torque via a crankshaft 22.

The first motor 14 may include any device configured to generate a first motor torque by, for example, converting electrical energy into rotational motion. For instance, the first motor 14 may be configured to receive electrical energy from a power source (not shown) such as a battery. The power source may be configured to store and output electrical energy, such as direct current (DC) energy. An inverter (not shown) may be used to convert the DC energy from the battery into alternating current (AC) energy. The first motor 14 may be configured to use the AC energy from the inverter to generate rotational motion. The first motor 14 may be further configured to generate electrical energy when provided with a torque, such as the engine torque. For example, the first motor 14 may generate AC energy that may be converted by the inverter into DC energy and stored in the power source.

The second motor 16 may include any device configured to generate a second motor torque by, for example, converting electrical energy into rotational motion. Like the first motor 14, the second motor 16 may be configured to receive electrical energy from the power source either directly or via the inverter. The second motor 16 may be further configured to generate electrical energy that may be stored in, for example, the power source.

The gearbox 18 may include any device configured to convert the engine torque, the first motor torque, and/or the second motor torque into rotational motion that may be used to propel the vehicle 10. For instance, the transmission gearbox 18 may include one or more planetary gearsets having a plurality of gears of various sizes.

The gearbox 18 may be configured to receive the engine torque and/or the first motor torque via a first input node 30, and the second motor torque via a second input node 32. The gearbox 18 may output the propulsion torque to wheels 34 of the vehicle 10 via an output shaft 28 connected to an output node 36.

While the vehicle 10 may include any number of clutches 20, a first clutch 20A, a second clutch 20B, and a third clutch 20C are illustrated in FIG. 1. The first clutch 20A may be grounded (for example, the driven mechanism is fixed and does not rotate) operatively connected to the first input node 30 of the gearbox 18. When the first clutch 20A is engaged, the first clutch 20A may prevent one or more gears in the gearbox 18 from rotating so that the second motor torque may be transferred from the second input node 32 to the output node 36 to propel the vehicle 10. The second clutch 20B may be operatively disposed between the first motor 14 and the first input node 30. When the second clutch 20B is engaged, the first motor torque may be transferred from the first motor 14 to the first input node 30 so that the vehicle 10 may be propelled, at least in part, by the first motor torque (in other words, the first motor torque contributes to the propulsion torque). The third clutch 20C may be operatively disposed between the engine 12 and the first motor 14. When the third clutch 20C is engaged, the engine torque may be transferred to the first motor 14 so that the first motor 14 may act as a generator if the second clutch 20B is disengaged or so that the engine torque alone or in combination with the first motor torque may be transferred to the first input node 30 of the gearbox 18 if the second clutch 20B is engaged.

The gearbox 18 is built to provide a hybrid powertrain that is capable of producing a plurality of operating modes. As is known to those of ordinary skill in the art, hybrid powertrains with multiple torque transfer devices may have multiple operating modes with different combinations of engine on, engine off, motor A on/off, motor B on/off, etc., with the torque path depending on the actuation state of the various clutches used in the powertrain. Referring to FIG. 1, the engagement of clutch 20C connects the engine 12 to the motor 14 in one possible mode. The engagement of clutch 20B connects motor 14 to node 30 in another possible mode. The engagement of clutch 20A grounds node 30, and allows torque from motor 16 to power node 32, with or without torque from motor 14, showing two additional modes. Thus the vehicle 10 may operate in a plurality of operating modes based on the engagement of one or more of the first clutch 20A, the second clutch 20B, and the third clutch 20C. The clutch 20 is configured to engage during a shift event from one of the plurality of operating modes to another of the plurality of operating modes. For example, the first clutch 20A may be engaged during a first operating mode and a second operating mode. The second clutch 20B may be engaged during the second operating mode and a third operating mode. The third clutch 20C may be engaged during the fourth operating mode. As such, the second clutch 20B may engage during the transition from the first operating mode to the second operating mode, and the third clutch 20C may engage during the transition from the third operating mode to the fourth operating mode. The first clutch 20A may engage during a transition to the first operating mode. Referring to FIG. 1, the controller 50 is configured to control engagement of an oncoming clutch 20 during a shift event from one of the plurality of operating modes to another of the plurality of operating modes.

Each clutch 20 may be hydraulically operated. That is, each clutch 20 may be configured to engage when provided with fluid at a minimum pressure and disengage when provided with fluid below the minimum pressure. Each clutch 20 may include any device configured to engage to transfer torque generated by one component of the vehicle 10 to another. For instance, each clutch 20 may include a driving mechanism and a driven mechanism. The driving mechanism may be configured to rotate when provided with a rotational force such as the engine torque, the first motor torque and the second motor torque. When fully engaged, the driven mechanism may rotate at the same speed as the driving mechanism. When disengaged or partially engaged, however, the driven mechanism is free to slip relative to the driving mechanism, allowing the driving mechanism and the driven mechanism to rotate at different speeds.

Shifting from one of the plurality of operating modes to another of the plurality of operating modes involves, in most cases, disengaging one clutch (off-going clutch, e.g. 20A) associated with the current operating mode and engaging another clutch (oncoming clutch, e.g. 20B) associated with the new operating mode. Each such shift event includes a fill or preparation phase during which a predefined volume of the oncoming clutch 20 is filled in preparation for torque transmission. Once filled, the oncoming clutch 20 transmits torque in relation to the applied pressure, and the shift can be completed using various control strategies.

Figure 2:
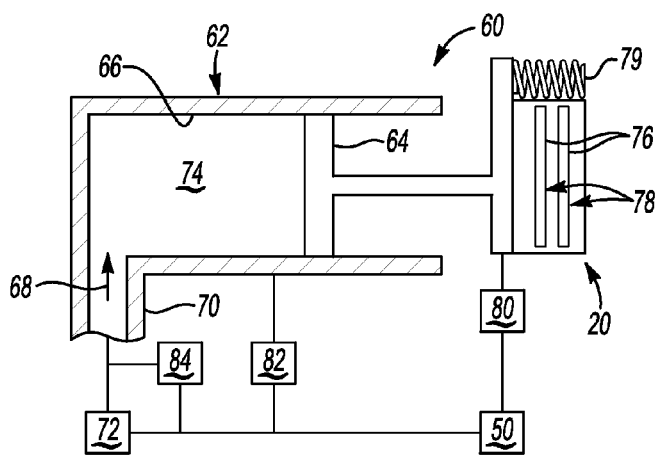
FIG. 2 is an example schematic illustration of the clutch of FIG. 1.
Figure 4:
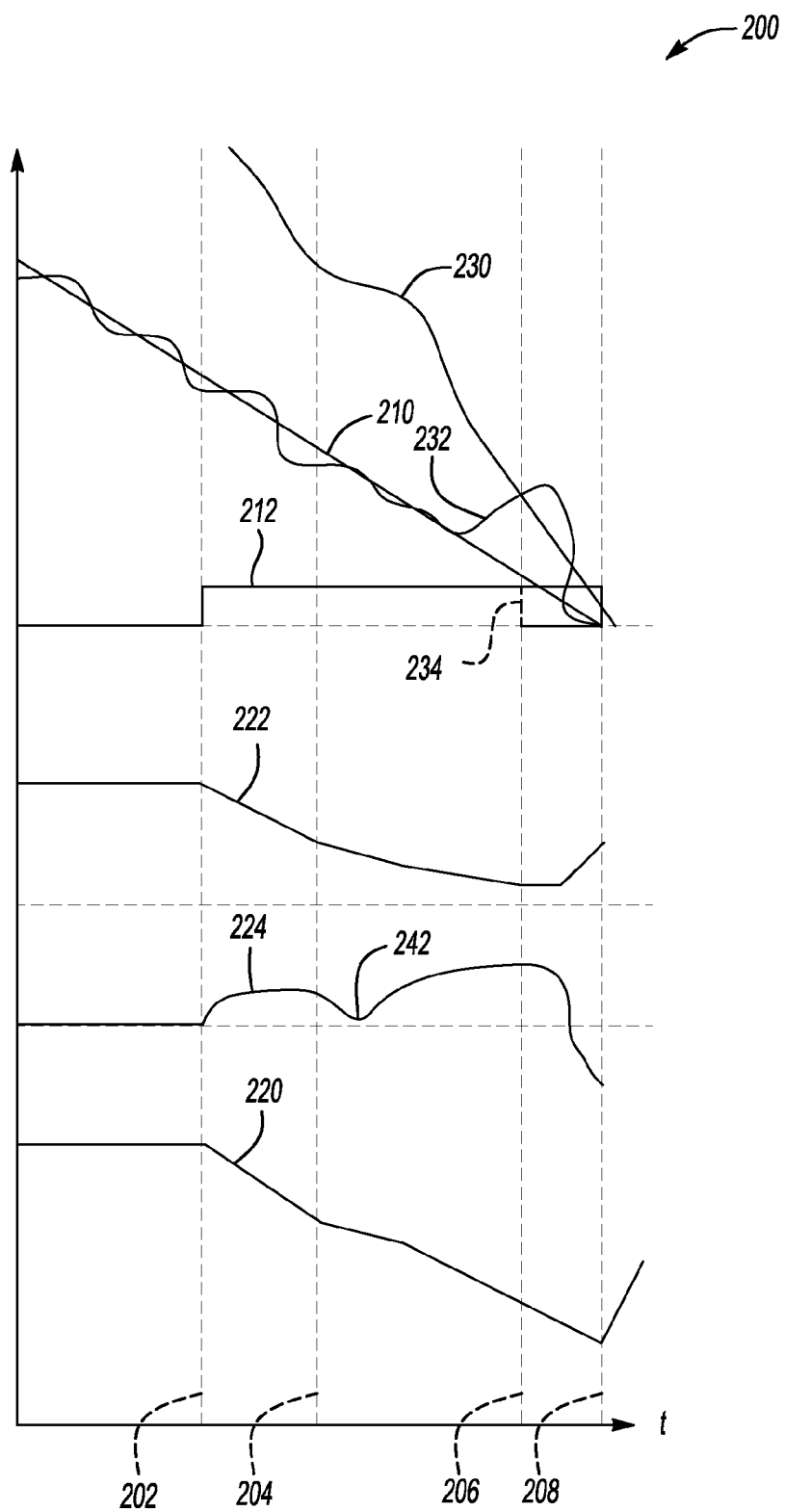
FIG. 4 is a set of profiles illustrating one example of applying the process of FIG. 3 during a shift event.

FIG. 2 schematically illustrates an example of an assembly 60 for an oncoming clutch 20. The assembly 60 (not drawn to scale) may take many different forms and include multiple and/or alternate components and facilities. It is to be understood that the example illustrated in FIG. 4 is not intended to be limiting. The assembly 60 includes a cylinder 62 having a piston 64 positioned within a chamber 66. When a clutch fill command is generated, pressurized hydraulic fluid 68 at some fill pressure enters the chamber 66 through a hydraulic line 70. The hydraulic line 70 is fluidly connected with a fluid pump 72. The assembly 60 may include pump regulators, such as a combination of pressure control solenoids (not shown).

Referring to FIG. 2, the fluid pump 72 may be configured to selectively provide fluid 68 to a predefined fill volume 74 when a clutch fill command is generated by the controller 50. The predefined fill volume 74 may include the volume of the chamber 66 as well as a portion of the hydraulic line 70. The hydraulic pressure applied by the fluid 68 in the predefined fill volume 74 moves the piston 64, thereby articulating the clutch 20 through various states.

As discussed below, once a clutch fill command is generated, the clutch 20 defines a real-time hydraulic state. In the embodiment shown, the real-time hydraulic state of the clutch 20 is characterized by a remaining fill time $T_r(t)$ or an amount of time remaining to fill an unfilled portion of the predefined fill volume 74. The real-time hydraulic state of the clutch 20 may be determined by a plurality of monitors operatively connected to the clutch 20. Referring to FIG. 2, a first monitor 82 is configured to determine a real-time unfilled portion of the predefined fill volume 74, that is, the portion of the predefined fill volume 74 remaining to be filled. A second monitor 84 is configured to determine a real-time flow rate of the fluid 68 entering the predefined fill volume 74.

Referring to FIG. 2, clutch 20 includes connective surfaces in the form of plates 76 interspersed with friction material 78. Any number of plates 76 may be used. When the clutch 20 is not actuated, the plates 76 are kept separate, for example, with the use of a biasing member 79 (e.g. a spring). When the clutch 20 is actuated and a pressure is applied, the plates 76 are brought into contact each other, and frictional forces between the plates 76 create a locked relationship where the plates 76 move in unison. Referring to FIG. 2, a speed sensor 80 is operatively connected to the clutch 20 and configured to detect a real-time speed of the clutch 20. The clutch 20 may include other components not shown.

Referring to FIG. 1, a controller 50 is configured to control engagement of an oncoming clutch 20 during a shift event from one of the plurality of operating modes to another of the plurality of operating modes. Stated differently, controller 50 is adapted to optimize control of the clutch fill command during the shift event. Controller 50 does so in part by executing a process 100 (shown in FIG. 3) which resides within the controller 50 or is otherwise readily executable by the controller 50. As is explained below, execution of process 100 serves to prevent pressure from being applied to and an oncoming clutch 20 that is slipping, thereby protecting the slipping clutch. Any pressure applied on an oncoming clutch 20 that is slipping may result in heat being generated on the friction material 78 and subsequent degradation of the friction material 78 in the clutch 20. Process 100 need not be applied in the specific order recited herein. Furthermore, it is to be understood that some steps may be eliminated.

Figure 3:
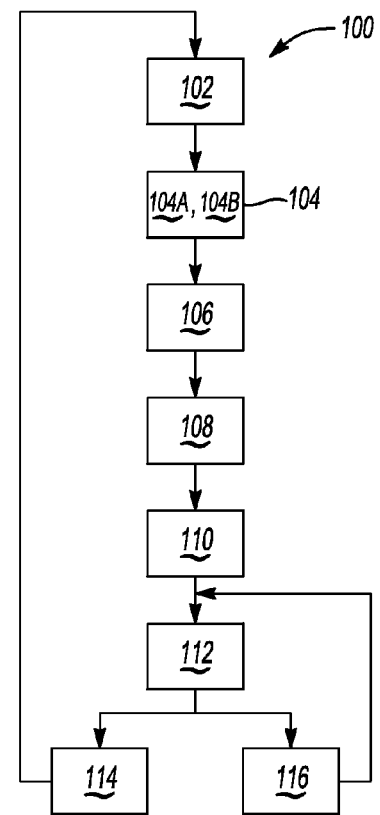
FIG. 3 is a flowchart of a process implemented by the controller of FIG. 1 to control engagement of the oncoming clutch of FIG. 1.

FIG. 4 is a set of profiles 200 illustrating one example of applying the process 100 of FIG. 3 during a shift event. The profiles 200 are synchronized for time at t=0 (line 202), t=1 (line 204), t=2 (line 206) and t=3 (line 208) and are intended to be non-limiting. Process 100 is described with reference to FIGS. 3-4. The controller 50 of FIG. 1 identifies a particular clutch within the vehicle 10 that is to serve as the oncoming clutch 20 during a shift event (transitioning from one of the plurality of operating modes of the vehicle 10 to another of the plurality of operating modes).

Referring to FIG. 3, process 100 may begin with step 102 where the controller 50 identifies a speed profile associated with the oncoming clutch 20 and the shift event. Referring to FIG. 4, an example of the identified speed profile 210 and an example of the clutch fill command 212 are shown. The identified speed profile defines an amount of time required to synchronize the clutch 20 during the shift event. The identified speed profile (or speed profile with respect to time) may be stored in one or more look-up tables, databases, data repositories, or any other type of data stores. Process 100 then proceeds to step 104.

At step 104, the controller 50 determines an initial time (shown in FIG. 4 as time t=0 or point 202), for generating the clutch fill command 212, such that completion of the clutch fill command 212 is synchronized with the identified speed profile (example profile 210 in FIG. 4) of the oncoming clutch 20. In other words, a point in time is predicted at which the clutch fill command 212 is to be generated in order to achieve complete hydraulic clutch fill at the point of clutch speed synchronization. This may be accomplished by sub-steps 104A and 104B.

In sub-step 104A, for the oncoming clutch 20, the controller 50 determines a predicted fill time $T_{fill}$ for filling a predefined fill volume 74 (an example of which is shown in FIG. 2). The predicted fill time $T_{fill}$, is the amount of time for the clutch fill command 212 to be fully executed, that is, the amount of time needed to engage the oncoming clutch 20. The oncoming clutch 20 is configured to transmit a torque related to an applied clutch pressure when the predefined fill volume 74 is completely filled with the fluid 68 (see FIG. 2). The controller 50 may determine the predicted fill time $T_{fill}$ as the predefined fill volume 74 divided by the initial flow rate of the fluid 68 entering the predefined fill volume 74. The initial flow rate may depend upon many factors, including but not limited to, the size and capacity of pumps supplying fluid (such as pump 72 in FIG. 2), leak rate, fluid passage geometry, fluid temperature, pressure, and any pressure differentials between the existing line pressure and the required fill pressure. The predicted fill time $T_{fill}$ may adjusted by calibration offset values to define a maximum fill time and a minimum fill time, i.e., a range of values instead if a fixed value. The calibration offset values may be stored in one or more look-up tables, databases, data repositories, or other types of data stores.

In sub-step 104B, the predicted fill time $T_{fill}$ is compared with the identified speed profile and an initial time is determined such that the clutch speed (in the identified speed profile) reaches zero when the predefined fill volume 74 is completely filled, in order to achieve complete hydraulic clutch fill at the point of clutch speed synchronization. Referring to FIG. 4, the initial time is set at t=0 (line 202), such that the identified speed profile 210 is synchronized with the completion of the clutch fill command 212. If it is allowed to proceed, i.e., not canceled, the clutch fill command 212 is completed at time t=3 (line 208). Process 100 then proceeds to step 106.

At step 106, the controller 50 generates the clutch fill command 212 at the initial time determined in step 104. The process 100 then proceeds to step 108.

At step 108, once the clutch fill command 212 is generated, the controller 50 determines a real-time hydraulic state of the clutch 20. This determination may be based on information from a plurality of monitors, such as the first and second monitors 82, 84 operatively connected to the clutch 20 in FIG. 2. In the embodiment shown, the real-time hydraulic state of the clutch 20 is characterized by a remaining fill time $T_r(t)$, defined as an amount of time remaining to fill an unfilled portion of the predefined fill volume 74. Referring to FIG. 4, an example profile 220 of a remaining fill time $T_r(t)$ is shown.

The controller 50 determines the remaining fill time $T_r(t)$ as a real-time unfilled portion $V_u(t)$ of the predefined fill volume 74 divided by a real-time flow rate $F(t)$ of the fluid 68 entering the predefined fill volume 74, e.g. $T_r(t)=V_u(t)/F(t)$. The remaining fill time $T_r(t)$ may be adjusted with calibration offset values. Referring to FIG. 4, an example profile 222 of the real-time unfilled portion $V_u(t)$ and an example profile 224 of the real-time flow rate $F(t)$ is shown. The process 100 then proceeds to step 110.

At step 110, based at least partially on the real-time hydraulic state of the clutch 20 determined in step 108, the controller 50 generates an acceptable speed margin $M(t)$ for the clutch 20. Referring to FIG. 4, an example profile 230 of the acceptable speed margin $M(t)$ is shown. The acceptable speed margin $M(t)$ may be determined as a function of the remaining fill time $T_r(t)$. The acceptable speed margin $M(t)$ may also be determined as a percentage of the remaining fill time $T_{fill}$ (i.e., percentage $T_r=T_r/T_{fill}$). This allows the acceptable speed margin $M(t)$ to be normalized across clutches of varying sizes and features.

One example of determining an acceptable speed margin $M(t)$ as a function of the percentage remaining fill time is described below. It is to be understood that this is just an example and is intended to be non-limiting, that is, any suitable method of determining the acceptable speed margin $M(t)$ may be employed. The acceptable speed margin $M(t)$ may be determined for a fixed number of time values (e.g. percentage time remaining 100%, 75%, 50%, 25%, 10%, 0%), with intermediate time values being interpolated. The acceptable speed margin $M(100)$ at 100% of time remaining may be set to an arbitrary value, for example, 2000 rpm. In a first example, the controller 50 multiplies the initial value by the percent time to fill [2000 rpm*Percent Time Remaining to Fill Clutch] to calculate the acceptable speed margin $M(t)$ for the six time values. The acceptable speed margin $M(75\%)$, $M(50\%)$, $M(25\%)$, $M(10\%)$, $M(0)$ will be 1500, 1000, 500, 200 and 0 rpm, respectively.

In a second example, the controller 50 sets the acceptable speed margin $M(100)$ at 100% of time remaining to be an initial speed value multiplied by a margin factor. For example, if the clutch is slipping 1000 rpm at the start of the fill process and factor of 1.5 is selected, $M(100)$ is set to be 1500 rpm. As the percent time is being reduced, the initial value $M(100)$ is multiplied by the percent time to fill to obtain the acceptable speed margin, i.e., the controller 50 multiplies the initial value by the percent time to fill [1500 rpm*Percent Time Remaining to Fill Clutch] to calculate the acceptable speed margin $M(t)$ for the six time values.

Referring to FIG. 3, at step 112, the controller 50 determines a real-time speed $S(t)$ of the clutch 20. For example, real-time speed may be obtained from a speed sensor operatively connected to the clutch 20, for example, the speed sensor 80 shown in FIG. 2. Referring to FIG. 4, an example profile 232 of the real-time speed $S(t)$ is shown. Next, the controller 50 determines whether the real-time speed $S(t)$ (profile 232 in FIG. 4) is within the acceptable speed margin $M(t)$ (profile 230 in FIG. 4).

Referring to FIG. 3, if the real-time speed $S(t)$ is outside the acceptable speed margin $M(t)$, the controller 50 cancels the clutch fill command 212 in step 114. As noted above, this avoids putting pressure on the oncoming clutch 20 while it is slipping. The process 100 may loop back to step 102 as shown in FIG. 3.

Referring to FIG. 3, if the real-time speed $S(t)$ is within the acceptable speed margin $M(t)$, the controller 50 proceeds with the clutch fill command 212 in step 116. Referring to FIG. 3, the process 100 may loop back to step 112 until the clutch fill command 212 is completed.

Referring to FIG. 4, the real-time speed $S(t)$ (profile 232) remains within the acceptable speed margin $M(t)$ (profile 230) prior to time t=2. Just at t=2, the real-time speed $S(t)$ (profile 232) goes outside the acceptable speed margin $M(t)$ (profile 230). As shown by line 234, the clutch fill command 212 is canceled at t=2, in accordance with step 114 of FIG. 3. If the real-time speed $S(t)$ (profile 230) had remained within the acceptable speed margin $M(t)$ (profile 230), the clutch fill command 212 would have proceeded to completion to time t=4 or line 208.

Since various parameters are determined in real time, the remaining time may change during each loop of the process 100. Thus, the clutch fill command 212 may be continued (per step 116) in one loop of the process 100 but canceled (per step 114) in the next loop of the process 100. This reduces the risk of engaging the oncoming clutch 20 prematurely, as circumstances of the vehicle 10 change. Additionally, each of the profiles 200 may be adjusted or calibrated with calibration offset values. The calibration offset values may be stored in one or more look-up tables, databases, data repositories, or other types of data stores.

Referring to FIG. 4, the acceptable speed margin $M(t)$ (profile 230) for the clutch 20 may be configured to be at a maximum value at the initial time t=0 for generating the clutch fill command 212 and configured to subsequently decrease. Referring to FIG. 4, an event 242 is shown at which the flow rate $F(t)$ (profile 224) rapidly declines. For example, this could be due to a faulty pump or other system restriction that causes the flow of fluid to the clutch to rapidly decline. As the system recovers, the flow rate $F(t)$ (profile 224) gradually increases.

The controller 50 of FIG. 1 may include a computing device that employs an operating system or processor for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle operable in a plurality of operating modes, the vehicle comprising:
   an oncoming clutch configured to engage during a shift event from one of the plurality of operating modes to another of the plurality of operating modes, the oncoming clutch being hydraulically-actuated;
   a controller operatively connected to the oncoming clutch and configured to generate a clutch fill command at an initial time such that completion of the clutch fill command is synchronized with an identified speed profile of the oncoming clutch;
   wherein the oncoming clutch defines a real-time hydraulic state when the clutch fill command is generated;
   wherein the controller is configured to generate a real-time acceptable speed margin for the oncoming clutch based at least partially on the real-time hydraulic state of the oncoming clutch;
   a speed sensor operatively connected to the oncoming clutch and configured to detect a real-time speed of the oncoming clutch;
   wherein the controller is configured to cancel the clutch fill command if the real-time speed of the oncoming clutch is outside the real-time acceptable speed margin; and
   wherein the acceptable speed margin for the oncoming clutch is configured to be at a maximum value at the initial time and configured to subsequently decrease.

2. The vehicle of claim 1, wherein the controller is configured to proceed with the clutch fill command if the real-time speed of the oncoming clutch is within the generated real-time acceptable speed margin.

3. The vehicle of claim 1, wherein the clutch fill command is configured to cause a predefined fill volume to be filled with a fluid.

4. The vehicle of claim 3, wherein the real-time hydraulic state of the oncoming clutch is characterized by a remaining fill time, the remaining fill time being defined as an amount of time remaining to fill an unfilled portion of the predefined fill volume.

5. The vehicle of claim 3, further comprising:
   a first monitor operatively connected to the oncoming clutch and configured to determine a real-time unfilled portion of the predefined fill volume;
   a fluid pump configured to selectively provide a fluid to the predefined fill volume when the clutch fill command is generated by the controller;
   a second monitor operatively connected to the oncoming clutch and configured to determine a real-time flow rate of the fluid entering the predefined fill volume;
   wherein the controller determines a remaining fill time at least partially based on the real-time unfilled portion of the predefined fill volume and the real-time flow rate; and
   wherein the real-time hydraulic state of the oncoming clutch is characterized by the remaining fill time.

6. A method of controlling a clutch fill command for an oncoming hydraulically-actuated clutch during a shift event, via a controller having a tangible, non-transitory medium for storing instructions and a processor for executing the instructions, the method comprising:
   identifying a speed profile associated with the oncoming clutch and the shift event, the speed profile defining an amount of time to synchronize the oncoming clutch during the shift event;
   determining an initial time for generating the clutch fill command such that completion of the clutch fill command is synchronized with the identified speed profile of the oncoming clutch;
   generating a clutch fill command at the initial time;
   determining a real-time hydraulic state of the oncoming clutch based on one or more monitors operatively connected to the clutch;
   generating an acceptable speed margin for the oncoming clutch based at least partially on the real-time hydraulic state of the oncoming clutch;
   detecting a real-time speed of the clutch from a speed sensor operatively connected to the clutch;
   canceling the clutch fill command if the real-time speed of the clutch is outside the acceptable speed margin for the clutch; and
   wherein the acceptable speed margin for the oncoming clutch is configured to be at a maximum value at the initial time for generating the clutch fill command and configured to subsequently decrease.

7. The method of claim 6, wherein determining the initial time for generating the clutch fill command includes:
   determining a predicted fill time for filling a predefined fill volume, the oncoming clutch being configured to transmit a torque related to an applied pressure when the predefined fill volume is completely filled with a fluid.

8. The method of claim 6, further comprising:
   proceeding with the clutch fill command if the real-time speed of the clutch is within the acceptable speed margin for the clutch.

9. The method of claim 6, wherein determining the real-time hydraulic state of the oncoming clutch includes:
   determining a real-time unfilled portion of a predefined fill volume, the oncoming clutch being configured to transmit a torque related to an applied oncoming clutch pressure when the predefined fill volume is completely filled with a fluid;
   determining a real-time flow rate of the fluid entering the predefined fill volume;
   determining a remaining fill time for the oncoming clutch based at least partially on the real-time unfilled portion of the predefined fill volume and the real-time flow rate.

10. The method of claim 9, wherein determining the real-time hydraulic state of the oncoming clutch further includes:
   generating a percentage remaining fill time for the oncoming clutch based at least partially on the remaining fill time.

11. A method of controlling a clutch fill command for an oncoming hydraulically-actuated clutch during a shift event, via a controller having a tangible, non-transitory medium for storing instructions and a processor for executing the instructions, the method comprising:
   identifying a speed profile associated with the oncoming clutch and the shift event, the speed profile defining an amount of time to synchronize the oncoming clutch during the shift event;
   determining an initial time for generating the clutch fill command such that completion of the clutch fill command is synchronized with the identified speed profile of the oncoming clutch;
   generating a clutch fill command at the initial time;
   determining a real-time hydraulic state of the oncoming clutch based on one or more monitors operatively connected to the clutch;
   generating an acceptable speed margin for the oncoming clutch based at least partially on the real-time hydraulic state of the oncoming clutch;
   detecting a real-time speed of the clutch from a speed sensor operatively connected to the clutch;
   canceling the clutch fill command if the real-time speed of the clutch is outside the acceptable speed margin for the clutch; and
   wherein determining the real-time hydraulic state of the oncoming clutch includes:
      determining a real-time unfilled portion of a predefined fill volume, the oncoming clutch being configured to transmit a torque related to an applied oncoming clutch pressure when the predefined fill volume is completely filled with a fluid;
      determining a real-time flow rate of the fluid entering the predefined fill volume;
      determining a remaining fill time for the oncoming clutch based at least partially on the real-time unfilled portion of the predefined fill volume and the real-time flow rate; and
      generating a percentage remaining fill time for the oncoming clutch based at least partially on the remaining fill time.

* * * * *